(12) United States Patent
Nelson

(10) Patent No.: US 12,104,688 B2
(45) Date of Patent: Oct. 1, 2024

(54) HYBRID MODULE SHAFT ASSEMBLY

(71) Applicant: Schaeffler Technologies AG & Co. KG, Herzogenaurach (DE)

(72) Inventor: Kyle Nelson, Wadsworth, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 435 days.

(21) Appl. No.: 17/479,038

(22) Filed: Sep. 20, 2021

(65) Prior Publication Data

US 2023/0089676 A1   Mar. 23, 2023

(51) Int. Cl.
  *F16H 57/04*   (2010.01)
  *F16H 57/021*  (2012.01)
  *F16H 57/02*   (2012.01)
  *F16H 57/029*  (2012.01)

(52) U.S. Cl.
  CPC ......... *F16H 57/043* (2013.01); *F16H 57/021* (2013.01); *F16H 57/0471* (2013.01); *F16H 57/0472* (2013.01); *F16D 2300/06* (2013.01); *F16D 2300/08* (2013.01); *F16D 2300/12* (2013.01); *F16H 2057/02043* (2013.01); *F16H 57/029* (2013.01); *F16H 57/0424* (2013.01); *Y10S 903/952* (2013.01)

(58) Field of Classification Search
  CPC .. F16H 57/043; F16H 57/021; F16H 57/0471; F16H 57/0472; F16H 57/029; F16H 57/0424; F16H 2057/02043; F16D 2300/06; F16D 2300/08; F16D 2300/12; Y10S 903/952
  USPC .............................................. 464/7; 192/204
  See application file for complete search history.

(56) References Cited

U.S. PATENT DOCUMENTS

| | | | | |
|---|---|---|---|---|
| 3,202,466 | A | * | 8/1965 | Kaptur .................... F16C 19/52 |
| 4,860,612 | A | * | 8/1989 | Dick ....................... B60K 17/34 |
| 9,611,023 | B2 | * | 4/2017 | Loftus, Jr. .............. B63H 20/20 |
| 10,895,317 | B2 | | 1/2021 | Heeke et al. |

OTHER PUBLICATIONS upfront.com, "The Difference between Plain, Ball and Roller Bearings" retrieved from the internet Jan. 11, 2024, at <<https://info.upfront.com>>. (Year: 2018).*

* cited by examiner

*Primary Examiner* — Greg Binda

(57) ABSTRACT

A hybrid module shaft assembly includes a rotational axis, a housing with a tubular portion, a shaft extending through the tubular portion, a first seal, a first ball bearing, and a plain bearing. The tubular portion has a first distal end arranged on an engine side of the housing, and a second distal end arranged on a transmission side of the housing. The first seal is arranged to seal the shaft to the first distal end, and the first ball bearing is disposed on the engine side adjacent to the first seal to position the shaft in the tubular portion. The plain bearing is arranged at the second distal end to position the shaft.

12 Claims, 3 Drawing Sheets

HYBRID MODULE SHAFT ASSEMBLY

TECHNICAL FIELD

The present disclosure relates generally to a hybrid module, and more specifically to a hybrid module shaft assembly.

BACKGROUND

Hybrid modules are known. One example is shown in commonly assigned U.S. Pat. No. 10,895,317 titled MAGNETIC FILTER IN A FLUID CHANNEL UPSTEAM OF ELECTRIC MOTOR IN A MODULAR HYBRID TRANSMISSION to Heeke et al., hereby incorporated by reference as is set forth fully herein.

SUMMARY

Example embodiments broadly comprise a hybrid module shaft assembly including a rotational axis, a housing with a tubular portion, a shaft extending through the tubular portion, a first seal, a first ball bearing, and a plain bearing. The tubular portion has a first distal end arranged on an engine side of the housing, and a second distal end arranged on a transmission side of the housing. The first seal is arranged to seal the shaft to the first distal end, and the first ball bearing is disposed on the engine side adjacent to the first seal to position the shaft in the tubular portion. The plain bearing is arranged at the second distal end to position the shaft.

In an example embodiment, the plain bearing includes an axially-extending groove arranged to allow a fluid flow between the plain bearing and the tubular portion, or between the plain bearing and the shaft. In an example embodiment, the tubular portion has a first drilled hole exiting axially between the first seal and the first ball bearing. In an example embodiment, the housing is made from aluminum. In an example embodiment, the tubular portion has a stepped portion for receiving the plain bearing. In an example embodiment, the hybrid module shaft assembly has a second ball bearing installed on the tubular portion radially outside of the plain bearing.

In some example embodiments, the shaft includes a first circumferential groove, and the tubular portion includes a second drilled hole, axially aligned with the first circumferential groove and arranged for fluid communication with the first circumferential groove. In an example embodiment, the hybrid module shaft assembly includes a first sealing ball. The shaft has a third distal end arranged on the transmission side, a third drilled hole extending radially inward from the first circumferential groove, and a fourth drilled hole extending axially between the third drilled hole and the third distal end. The first sealing ball is disposed in the fourth drilled hole at the third distal end to seal the fourth drilled hole.

In some example embodiments, the hybrid module shaft assembly includes a second seal disposed in the shaft on the engine side of the second circumferential groove and arranged to seal the shaft to the tubular portion, and a third seal disposed in the shaft on the transmission side of the second circumferential groove and arranged to seal the shaft to the tubular portion. In some example embodiments, the hybrid module shaft assembly includes a metal sleeve installed in the tubular portion radially between the tubular portion, and the second seal and the third seal. In an example embodiment, the metal sleeve has an aperture for permitting fluid communication between the second drilled hole and the first circumferential groove.

In some example embodiments, the shaft includes a second circumferential groove disposed axially between the third seal and the plain bearing, the second circumferential groove has a groove width, and the metal sleeve does not extend over an entirety of the groove width. In an example embodiment, the hybrid module shaft assembly includes a second sealing ball. The shaft includes a fifth drilled hole extending radially inward from the second circumferential groove, and a sixth drilled hole extending axially between the fifth drilled hole and the third distal end. The second sealing ball is disposed in the sixth drilled hole at the third distal end to seal the sixth drilled hole.

In an example embodiment, the shaft includes an alternate third drilled hole extending from the second circumferential groove radially inward and axially towards the transmission side, and an alternate fourth drilled hole extending from the transmission side of the plain bearing radially inward and axially towards the engine side to meet the alternate third drilled hole such that the alternate third drilled hole and the alternate fourth drilled hole are in fluid communication.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
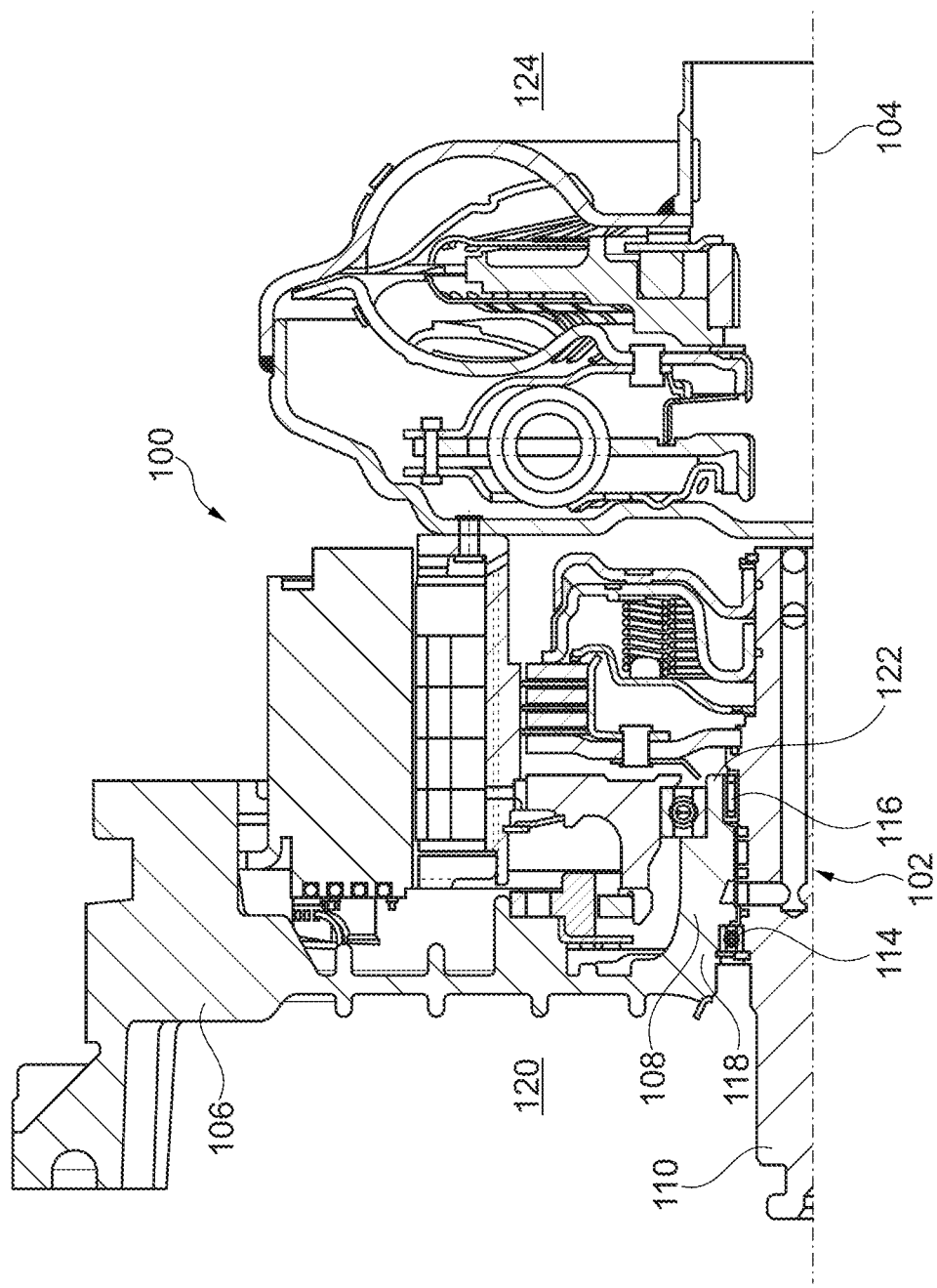
FIG. 1 illustrates a top half cross sectional view of a prior art hybrid module.

The following description is made with reference to FIG. 1. FIG. 1 illustrates a top half cross sectional view of prior art hybrid module 100. Prior art hybrid module 100 includes hybrid module shaft assembly 102 with rotational axis 104, housing 106 with tubular portion 108, shaft 110 extending through the tubular portion, ball bearing 114 and needle bearing 116. By needle bearing, I mean a special type of roller bearing which uses long, thin cylindrical rollers resembling needles that are small in diameter relative to their length. The tubular portion includes distal end 118 arranged on engine side 120 of the housing, and distal end 122 arranged on transmission side 124 of the housing. Ball bearing 114 is disposed on the engine side to position the shaft in the tubular portion. Needle bearing 116 is arranged at distal end 122 to position the shaft.

Figure 2:
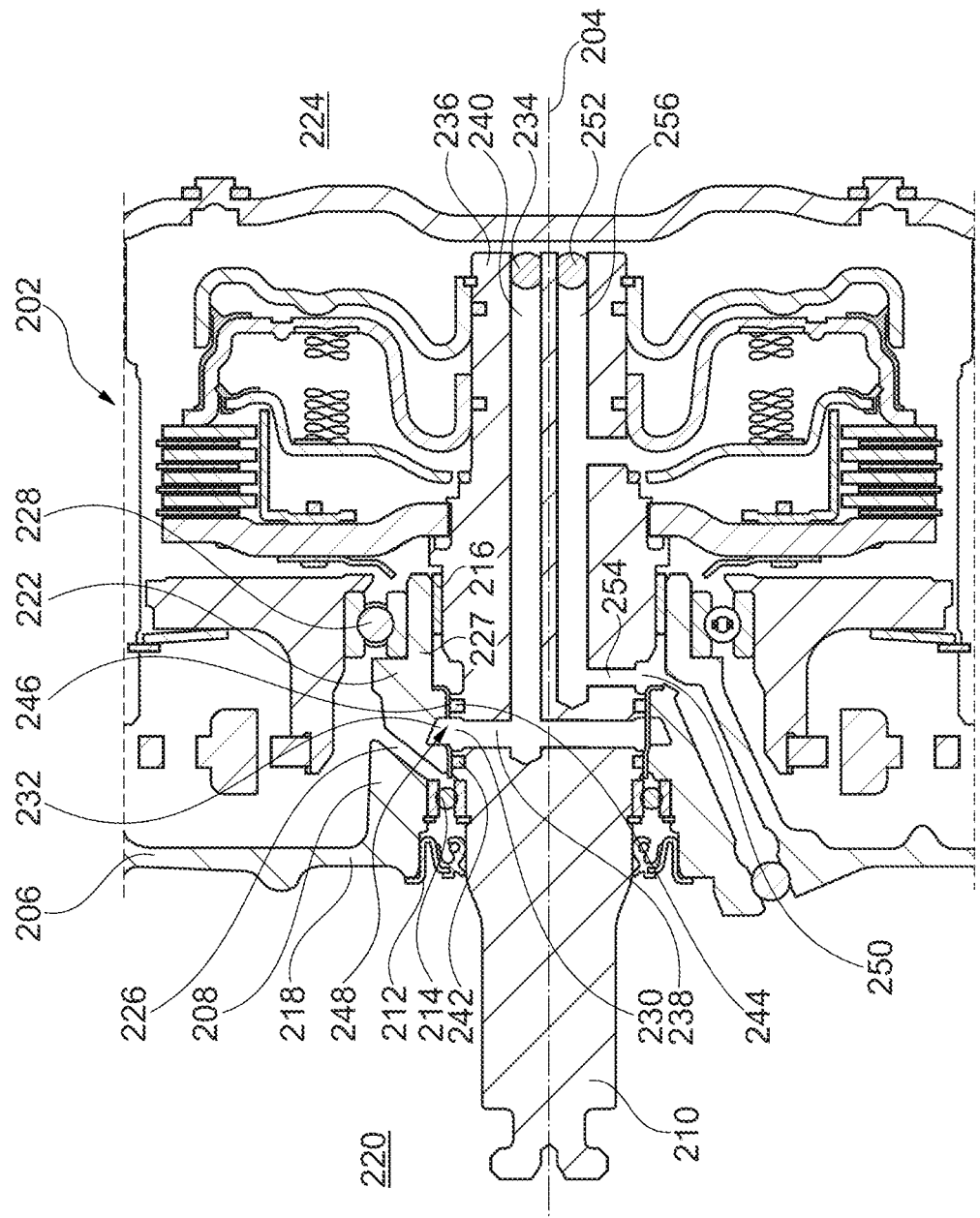
FIG. 2 illustrates a detail cross-sectional view of a first example embodiment of a hybrid module shaft assembly according to an example aspect of the present disclosure.

The following description is made with reference to FIG. 2. FIG. 2 illustrates a detail cross-sectional view of hybrid module shaft assembly 202 according to an example aspect of the present disclosure. Hybrid module shaft assembly 202 includes rotational axis 204, housing 206 with tubular portion 208, shaft 210 extending though the tubular portion, seal 212, ball bearing 214 and plain bearing 216. By plain bearing, I mean a bearing including just a bearing surface and no rolling elements. The tubular portion includes distal end 218 arranged on engine side 220 of the housing, and distal end 222 arranged on transmission side 224 of the housing. Seal 212 is arranged to seal the shaft to distal end 218, and ball bearing 214 is disposed on the engine side adjacent to seal 212 to position the shaft in the tubular portion. Plain bearing 216 is arranged at distal end 222 to position the shaft. Plain bearing 216 may include an axially-extending groove (not shown) arranged to allow a fluid flow between the plain bearing and the tubular portion, or between the plain bearing and the shaft.

Tubular portion 208 includes drilled hole 226 exiting axially between seal 242 and ball bearing 214 for providing a lubricant to the ball bearing and/or relieving pressure on seal 212, for example. Housing 206 may be made of aluminum by casting so that the housing is strong but relatively lightweight, for example. Tubular portion 208 includes stepped portion 227 for receiving the plain bearing. That is, the stepped portion provides axial and radial positioning of the plain bearing in the housing. The bearing may be pressed into the tubular portion at the stepped portion, for example. Shaft assembly 202 also includes ball bearing 228 installed on the tubular portion radially outside of the plain bearing for positioning additional components relative to the housing (e.g., a rotor carrier for an electric motor as shown in FIG. 1).

Shaft 210 includes circumferential groove 230 and tubular portion 208 includes drilled hole 232, axially aligned with circumferential groove 230 and arranged for fluid communication with circumferential groove 230. By fluid communication, I mean that a fluid can be exchanged between the two features. For example, fluid in circumferential groove 230 can flow to drilled hole 232, and vice versa. Shaft assembly 202 includes sealing ball 234. Shaft 210 includes distal end 236 arranged on the transmission side, drilled hole 238 extending radially inward from the first circumferential groove, and drilled hole 240 extending axially between drilled hole 238 and distal end 236. Sealing ball 234 is disposed in drilled hole 240 at distal end 236 to seal drilled hole 240. That is, since the hole is drilled from the distal end and open at the distal end, a sealing ball must be inserted to direct fluid to apply a piston or fill a balance chamber, for example, preventing the fluid from flowing out the end of the shaft.

Hybrid module shaft assembly 202 also includes seal 242 disposed in the shaft on the engine side of circumferential groove 230 and arranged to seal the shaft to the tubular portion, and seal 244 disposed in the shaft on the transmission side of circumferential groove 230 and arranged to seal the shaft to the tubular portion. In other words, seals 242 and 244 are arranged to control fluid flow such that fluid exiting drilled hole 232 must flow into circumferential groove since the seals prevent fluid escaping between the shaft and the tubular portion (or between the shaft and metal sleeve 246, as described below).

Hybrid module shaft assembly 202 includes metal sleeve 246 installed in the tubular portion radially between the tubular portion, and seals 242 and 244. That is, the sleeve is pressed into the tubular portion and rides against the seals, preventing wear of the aluminum housing. Since the shaft is arranged to rotate within the tubular portion, seals 242 and 244 may also rotate against the stationary housing and may wear into the housing during certain operating conditions (e.g., high pressure and/or high relative speeds) or extended operation. Sleeve 246 includes aperture 248 for permitting fluid communication between drilled hole 232 and circumferential groove 230.

Shaft 210 includes circumferential groove 250 disposed axially between seal 244 and the plain bearing. Circumferential groove 250 includes a groove width and the metal sleeve does not extend over an entirety of the groove width. Hybrid module shaft assembly 202 also includes sealing ball 252. The shaft includes drilled hole 254 extending radially inward from circumferential groove 250, and drilled hole 256 extending axially between drilled hole 254 and distal end 236. Sealing ball 252 is disposed in drilled hole 256 at distal end 236 to seal drilled hole 256, similar to sealing ball 234 in drilled hole 240 described above.

The plain bearing provides a sealing function (with controlled leakage radially between the shaft and the bearing and/or through a groove, if desired), eliminating a seal and reducing a length of the metal sleeve when compared with the prior art hybrid module of FIG. 1. Furthermore, the plain bearing may be more robust during assembly of the shaft into the housing, reducing the possibility of damaging the needle bearing used in the prior art.

Figure 3:
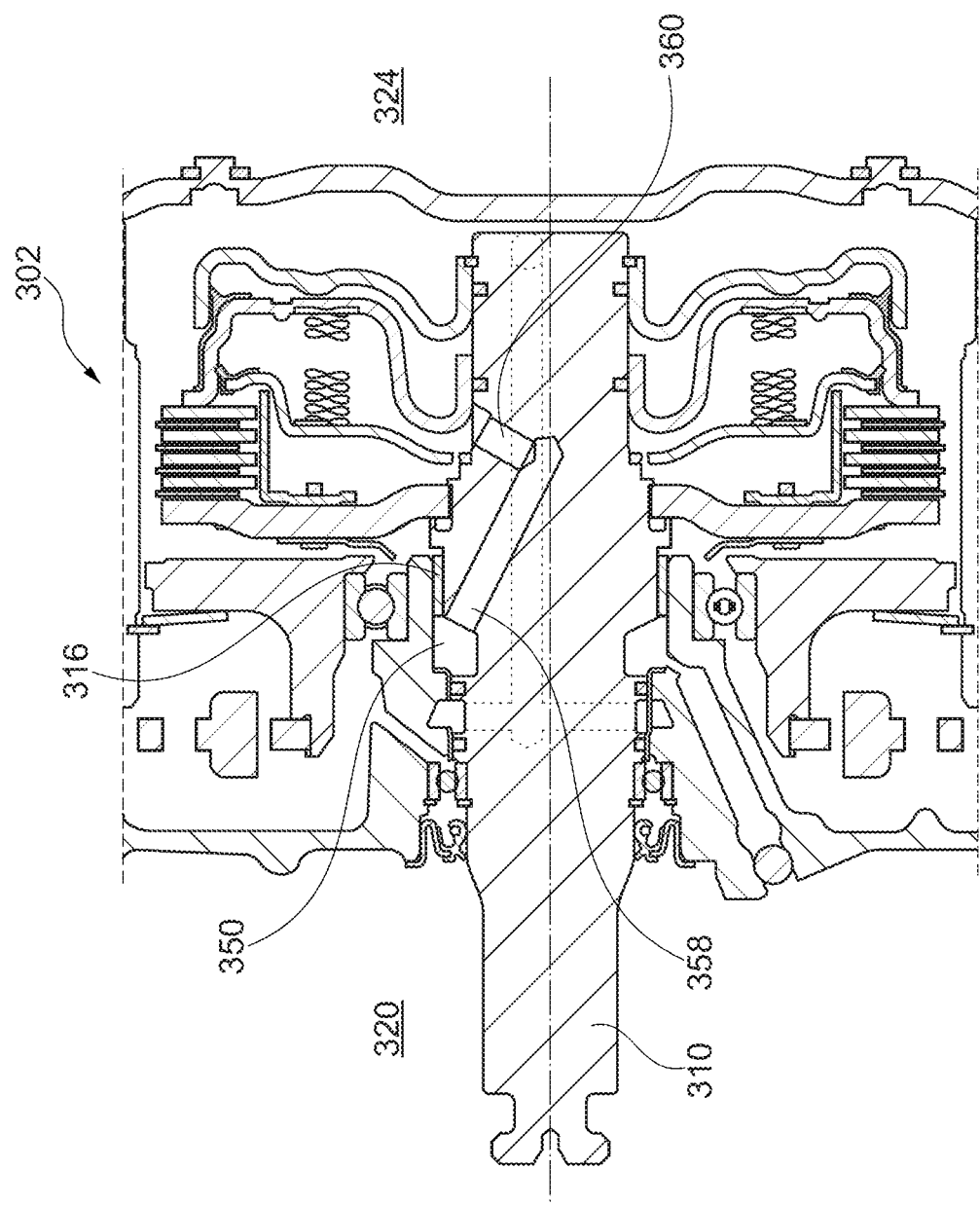
FIG. 3 illustrates a detail cross-sectional view of a second example embodiment of a hybrid module shaft assembly according to an example aspect of the present disclosure.

The following description is made with reference to FIG. 3. The example embodiment of FIG. 3 is generally the same as the example embodiment of FIG. 2, except as described below. Hybrid module shaft assembly 302 includes shaft 310. Shaft 310 includes drilled hole 358 extending from circumferential groove 350 radially inward and axially towards transmission side 324, and drilled hole 360 extending from transmission side 324 of plain bearing 316 radially inward and axially towards engine side 320 to meet drilled hole 358 such that the drilled holes 358 and 360 are in fluid communication. Due to the arrangement of drilled holes 358 and 360, a sealing ball (e.g., sealing ball 252 in FIG. 2) is not required.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

- 100 Hybrid module
- 102 Hybrid module shaft assembly
- 104 Rotational axis
- 106 Housing
- 108 Tubular portion
- 110 Shaft
- 114 Ball bearing (first)
- 116 Needle bearing
- 118 Distal end (first)
- 120 Engine side (of the housing)
- 122 Distal end (second)
- 124 Transmission side (of the housing)
- 202 Hybrid module shaft assembly
- 204 Rotational axis
- 206 Housing
- 208 Tubular portion
- 210 Shaft
- 212 Seal (first)
- 214 Ball bearing (first)
- 216 Plain bearing
- 218 Distal end (first)
- 220 Engine side
- 222 Distal end (second)
- 224 Transmission side
- 226 Drilled hole (first)
- 227 Stepped portion (tubular portion)
- 228 Ball bearing (second)
- 230 Circumferential groove (first)
- 232 Drilled hole (second)
- 234 Sealing ball (first)
- 236 Distal end (third)
- 238 Drilled hole (third)
- 240 Drilled hole (fourth)
- 242 Seal (second)
- 244 Seal (third)
- 246 Metal sleeve
- 248 Aperture (metal sleeve)
- 250 Circumferential groove (second)
- 252 Sealing ball (second)
- 254 Drilled hole (fifth)
- 256 Drilled hole (sixth)
- 302 Hybrid module shaft assembly
- 310 Shaft
- 316 Plain bearing
- 320 Engine side
- 324 Transmission side
- 350 Circumferential groove (second)
- 358 Drilled hole (alternate third)
- 360 Drilled hole (alternate fourth)

What is claimed is:

1. A hybrid module shaft assembly, comprising:
a rotational axis;
a housing comprising a tubular portion, the tubular portion comprising:
a first distal end arranged on an engine side of the housing; and
a second distal end arranged on a transmission side of the housing;
a shaft extending through the tubular portion;
a first seal arranged to seal the shaft to the first distal end;
a first ball bearing disposed on the engine side adjacent to the first seal to position the shaft in the tubular portion;
a plain bearing arranged at the second distal end to position the shaft; and
a second seal disposed in the shaft on the transmission side of the first ball bearing and arranged to seal the shaft to the tubular portion, wherein the tubular portion further comprises a first drilled hole exiting axially between the first-second seal and the first ball bearing.

2. The hybrid module shaft assembly of claim 1, wherein the housing is made from aluminum.

3. The hybrid module shaft assembly of claim 1, wherein the tubular portion comprises a stepped portion for receiving the plain bearing.

4. The hybrid module shaft assembly of claim 1, further comprising a second ball bearing installed on the tubular portion radially outside of the plain bearing.

5. The hybrid module shaft assembly of claim 1, wherein:
the shaft comprises a first circumferential groove; and
the tubular portion comprises a second drilled hole, axially aligned with the first circumferential groove and arranged for fluid communication with the first circumferential groove.

6. The hybrid module shaft assembly of claim 5, further comprising a first sealing ball, wherein:
the shaft comprises:
a third distal end arranged on the transmission side;
a third drilled hole extending radially inward from the first circumferential groove; and
a fourth drilled hole extending axially between the third drilled hole and the third distal end; and
the first sealing ball is disposed in the fourth drilled hole at the third distal end to seal the fourth drilled hole.

7. The hybrid module shaft assembly of claim 5, further comprising:
a third seal disposed in the shaft on the transmission side of the first circumferential groove and arranged to seal the shaft to the tubular portion.

8. The hybrid module shaft assembly of claim 7, further comprising a metal sleeve installed in the tubular portion radially between:
the tubular portion; and
the second seal and the third seal.

9. The hybrid module shaft assembly of claim 8, wherein the metal sleeve comprises an aperture for permitting fluid communication between the second drilled hole and the first circumferential groove.

10. The hybrid module shaft assembly of claim 8, wherein:
the shaft comprises a second circumferential groove disposed axially between the third seal and the plain bearing, the second circumferential groove comprising a groove width; and
the metal sleeve does not extend over an entirety of the groove width.

11. The hybrid module shaft assembly of claim 10, further comprising a second sealing ball, wherein:
the shaft comprises:
a third distal end arranged on the transmission side;
a fifth drilled hole extending radially inward from the second circumferential groove; and
a sixth drilled hole extending axially between the fifth drilled hole and the third distal end; and
the second sealing ball is disposed in the sixth drilled hole at the third distal end to seal the sixth drilled hole.

12. The hybrid module shaft assembly of claim 10, wherein the shaft comprises:
a third drilled hole extending from the second circumferential groove radially inward and axially towards the transmission side; and
a fourth drilled hole extending from the transmission side of the plain bearing radially inward and axially towards the engine side to meet the third drilled hole such that the third drilled hole and the eighth fourth drilled hole are in fluid communication.

* * * * *